United States Patent [19]

Gray et al.

[11] Patent Number: 4,853,689
[45] Date of Patent: Aug. 1, 1989

[54] AIR BRAKE COMPRESSOR FAILURE WARNING SYSTEM

[76] Inventors: William M. Gray, 150 Happy Acres Rd., Los Gatos, Calif. 95030; John H. Otteman, 4005 Hecker Pass Hwy., Gilroy, Calif. 95020

[21] Appl. No.: 66,895

[22] Filed: Jun. 25, 1987

[51] Int. Cl.⁴ .............................................. B60Q 9/00
[52] U.S. Cl. .................................... 340/453; 340/671
[58] Field of Search .................... 340/52 B, 671, 672, 340/52 R, 526, 679; 307/120; 324/174, 175; 417/63; 250/231 SE

[56] References Cited

U.S. PATENT DOCUMENTS

| | | | |
|---|---|---|---|
| 3,550,108 | 12/1970 | Orlando | 340/671 |
| 3,701,139 | 10/1972 | Creuz | 340/671 |
| 4,090,181 | 5/1978 | Ansari et al. | 340/671 |
| 4,264,905 | 4/1981 | Shapiro | 340/679 |
| 4,418,288 | 11/1983 | Imai et al. | 340/672 X |

Primary Examiner—Herbert Goldstein
Assistant Examiner—Brian R. Tumm
Attorney, Agent, or Firm—Donald D. Mon

[57] ABSTRACT

A warning for a vehicular air brake system, which system is powered by air compressed by a rotary compressor. A sensor senses rotation of some part of the compressor, and if a signal respective to rotation is not sensed during a predetermined increment of time, an alarm is caused to alert the operator of an impending lack of compressed air.

9 Claims, 1 Drawing Sheet

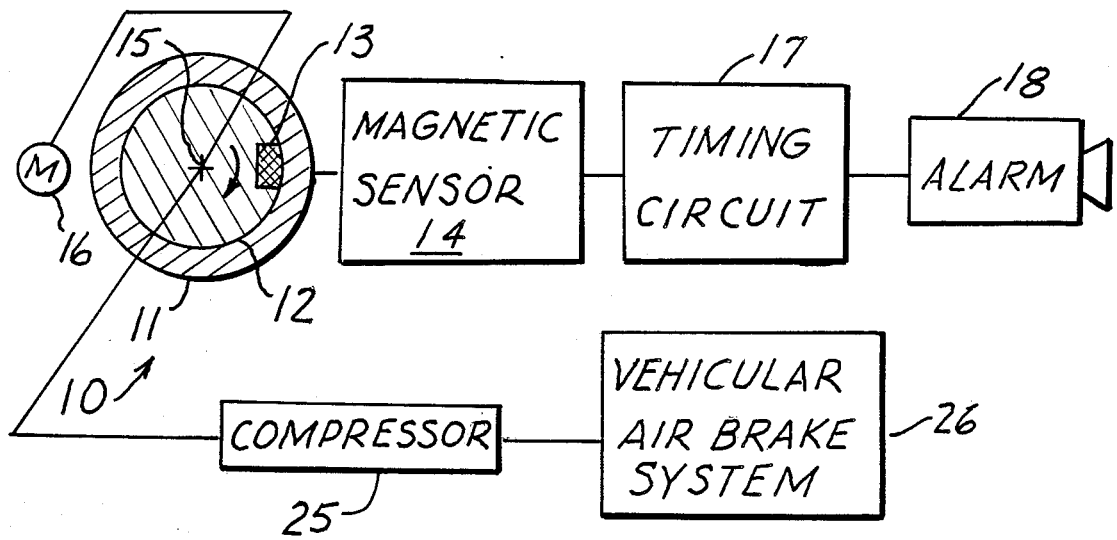
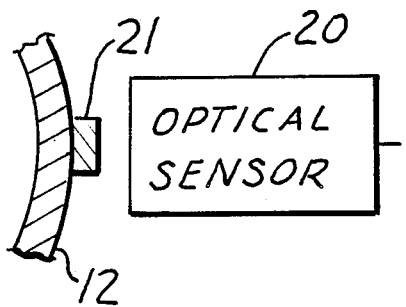

AIR BRAKE COMPRESSOR FAILURE WARNING SYSTEM

FIELD OF THE INVENTION

This invention relates to air brakes, and especially to circuitry to give an early warning of compressor failure.

BACKGROUND OF THE INVENTION

Failure of the compressed air supply to an air brake system is a potentially catastrophic event. Conventional circuitry systems exist to warn of this situation, but they warn only of a low reserve tank pressure. This low pressure reserve air can give at most only a short brake actuation, which may be insufficient to stop the vehicle. The problem is that the warning comes too late- only after the pressure has dropped to a precautionary level.

This invention proposes that warning be given of events which are precursors to loss of pressure, namely events which result in stoppage of the compressor itself. This may reflect a frozen or sheared compressor drive shaft, a broken compressor drive belt, or stripped gears or couplings. All of these events, and others lead to compressor failure, but which will not be noticed by conventional systems until after the system air pressure has fallen, perhaps to an unsafe level. It is an object of this invention to give an earilier warning, increasing the chances for a safe stop.

BRIEF DESCRIPTION OF THE INVENTION

The warning system of this invention includes sensor means responsive to the rotation of a rotary element of the compressor or of something which rotates with it. The sensor means produces a signal responsive to that rotation.

Timing circuitry receives the signal from the sensor. In the event that within a predetermined time a signal has not been received by it that evidences rotation of the rotary element of the compressor, this circuitry will initiate an alarm.

According to a preferred but optional feature of the invention, the sensor is a magnetic pickup responsive to a magnet carried by the rotary element, or an optical pickup responsive to variations of incident light.

The above and other features of this invention will be fully understood from the following detailed description and the accompanying drawings, in which:

BRIEF DESCRIPTION OF THE DRAWINGS

FIG. 1 is a schematic drawing illustrating the invention; and FIG. 2 is a fragmentary view of another sensor arangement.

DETAILED DESCRIPTION OF THE INVENTION

FIG. 1 is a schematically shows a compressor 10 with a fixed portion 11 such as a housing, and a rotary element 12, such as a rotor. A magnet 13 is carried by the rotary element. A magnetic sensor 14, such as a magnetic pickup, is mounted on or adjacent to portion 11 so as to sense the magnet as it passes the pickup when element 12 rotates around axis 15. Element 12 is driven by a motor 16, directly or through shafts, couplings, belts, pulleys, or otherwise.

It is best practice to sense rotation as closely as possible to the portion of the compressor which actually moves the air, for example, at the impeller or star wheel. The closer the sensor is placed to this element, the better. For example, if the drive shaft is broken and the magnet is on a part of the shaft which may still be turning, no warning would be given, even though the impeller itself might no longer be turning. Still, in many systems, detection of shaft rotation or some other part which turns when the impeller does, may be adequate, and is within the scope of the invention. The term "rotary element" as used herein thereby includes all parts which turn when the impeller does although sensing the impeller's rotation is preferred.

A timing circuit 17 receives signals from sensor 14 in the form of electrical pulses generated each time the magnet passes the pickup. The timing circuit includes a clock circuit which measures increments of time, and is responsive to the pulsed signal. In the event that a pulse is received from the sensor within the measured predetermineded increment of time, the timing circuit remains passive. In the event that a pulse is not received within the measured increment of time, the timing circuit will activate an alarm 18, which may be audible, visible, or both. This circuitry is conventional and requires no detailed description here.

Clock circuitry responsive to the presence or absence of a signal within an increment of time is well-known. Any such circuit will be suitable for use in this invention. The alarm circuit may conveniently be provided with latch circuitry to keep the alarm actuated once it has started.

Instead of a magnetic sensor, optical types may be used, such as light-and-dark responsive sensors, responsive to reflections or emissions of light from stripes on the moving element.

FIG. 2 shows an optical sensor 20 adjacent to some visible portion of rotary element 12, carrying a reflective element 21 which with the sensor provides a signal each revolution.

As shown in FIG. 1, the rotary element 12 is in the drive system for a compressor 25. The compressor supplies compress air to a vehicular air brake system 26. Such systems characteristically include air storage tanks, brake valves and brakes, which require no detailed description here. The sensors of FIGS. 1 and 2 are both adapted to this use.

This invention thereby provides an early warning of compressor failure with a simple device adaptable both to original equipment, and to existing equipment as an add-on accessory.

This invention is not to be limited to the embodiments shown in the drawings and described in the description, which are given by way of example and not of limitation, but only in accordance with the scope of the the appended claims.

We claim:

1. In combination: a vehicular air brake system which includes air pressure actuated brakes and a compressor for supplying compressed air to operate said brakes, said system including a rotary element whose rotation is concurrent with rotation of compression means in the compressor; and warning means comprising: sensor means responsive to rotation of said rotary element, said sensor means being adapted to produce a signal indicative of rotation of said rotary element when said element rotates, timing circuitry responsive to said signal, adapted to determine whether a signal respective to said rotation has or has not been received within a predetermined increment of time, and alarm means adapted to be actuated by said timing circuit if and when such signal is not received within said predetermined increment of time.

2. A combination according to claim 1 in which said sensor means comprises a magnet on said rotary element, and a magnetic pickup responsive to its passage.

3. A combination according to claim 1 in which said alarm means produces an audible output.

4. A combination according to claim 1 in which said alarm means produces a visible output.

5. A combination according to claim 1 in which said rotary element is an air movement portion of the comprssor.

6. A combination according to claim 5 in which said sensor means comprises a magnet on said rotary element, and a stationary magnetic pickup responsive to the passage of said magnet.

7. A combination according to claim 5 in which said sensor means comprises an optical pickup responsive to variations in light from said rotary element.

8. A combination according to claim 1 in which sensor means comprises an optical pickup responsive to variations in light from said rotary element.

9. A combination according to claim 1 in which said rotary element is a drive shft for an air movement portion of said compressor.

* * * * *